(12) United States Patent
Kothapalli Venkata et al.

(10) Patent No.: US 10,171,987 B1
(45) Date of Patent: Jan. 1, 2019

(54) IMPI-BASED PERSONALIZATION

(71) Applicant: QUALCOMM Incorporated, San Diego, CA (US)

(72) Inventors: Phani Pradeep Kumar Kothapalli Venkata, Hyderabad (IN); Naga Chandan Babu Gudivada, Hyderabad (IN); Rajendra Prasad Nelurouth, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/849,273

(22) Filed: Dec. 20, 2017

(51) Int. Cl.
*H04W 8/06* (2009.01)
*H04W 8/18* (2009.01)
*H04B 1/3818* (2015.01)
*H04W 12/12* (2009.01)
*H04L 29/06* (2006.01)
*H04W 12/10* (2009.01)

(52) U.S. Cl.
CPC ............ *H04W 8/06* (2013.01); *H04B 1/3818* (2015.01); *H04W 8/183* (2013.01); *H04W 12/12* (2013.01); *H04L 63/0428* (2013.01); *H04L 63/123* (2013.01); *H04W 12/10* (2013.01)

(58) Field of Classification Search
CPC ....... H04W 8/205; H04W 8/183; H04W 8/06; H04W 12/12
See application file for complete search history.

(56) References Cited

U.S. PATENT DOCUMENTS

| | | | |
|---|---|---|---|
| 7,725,734 B2 | 5/2010 | Bumiller et al. | |
| 9,819,374 B2 | 11/2017 | Kovacevic | |
| 2015/0105058 A1 | 4/2015 | Chuang | |
| 2016/0142467 A1* | 5/2016 | Ban .......................... | H04L 67/02 709/219 |

FOREIGN PATENT DOCUMENTS

| | | |
|---|---|---|
| CN | 101437067 A | 5/2009 |
| EP | 2680627 A1 | 1/2014 |

* cited by examiner

*Primary Examiner* — Keith Ferguson
(74) *Attorney, Agent, or Firm* — Hunter Clark PLLC

(57) ABSTRACT

Aspects of the disclosure are related to a method, apparatus and system for determining whether mobile network functions of a locked device are to be permitted to operate, comprising: retrieving an IMS "IP Multimedia Subsystem" Private User Identity (IMPI) stored on a Universal Integrated Circuit Card (UICC) installed in the locked device; determining whether a configured condition relating to the IMPI stored on the UICC is met; and permitting the mobile network functions of the locked device to operate in response to determining that the configured condition is met.

30 Claims, 5 Drawing Sheets

IMPI-BASED PERSONALIZATION

FIELD

Embodiments of the disclosure relate to mobile network user equipment, and more particularly, to the operator lock on the user equipment.

BACKGROUNDS

Mobile network operators (hereinafter "operators") may subsidize the purchase prices of end-user mobile devices (e.g., mobile phones) to boost subscription to their services. To ensure that mobile devices purchased at the subsidy prices are indeed used on the network of the operator providing the subsidies, the operator may place an operator lock on such devices. Hereinafter the operator subsidizing the device purchase and instituting the operator lock may be referred to as the home operator, and the device with the operator lock the locked device.

Ideally, an operator lock works by blocking the mobile network functions of the locked device when the universal integrated circuit card (UICC) (also colloquially referred to as the SIM "Subscriber Identity Module" card) (either removable or embedded) installed in the locked device does not come from the home operator. In practice, the conventional operator lock is based on the IMSI (International Mobile Subscriber Identity) information stored on the UICC, which uniquely identifies the user subscription.

Each operator is associated with a 3-digit Mobile Country Code (MCC), which identifies the country the operator is located in, and a 2 or 3-digit Mobile Network Code (MNC), which identifies the operator within the country specified by the MCC. The first three digits of an IMSI is the MCC, and the next two or three digits is the MNC. In other words, the combination of MCC-MNC, which corresponds to a specific operator, can be derived from an IMSI. Conventionally, an operator lock determines whether the MCC-MNC combination derived from the IMSI matches the MCC-MNC combination of the home operator, and 1) permits the mobile network functions when there is a match, or 2) blocks the mobile network functions when there is not a match.

The conventional operator lock has worked well until the advent of multi-IMSI roaming. Multi-IMSI roaming allows user to access more preferential roaming rates with roaming partner operators with whom the home operator has roaming agreements. With multi-IMSI roaming, a roaming partner operator's IMSI, which is pre-stored or remotely provisioned on the UICC, becomes active when the user device leaves the home operator's coverage area, and roams onto and registers with the roaming partner operator's network.

Therefore, to ensure the proper functioning of multi-IMSI roaming in light of the multiple IMSIs that may be used throughout the home operator's network and the one or more roaming partner operators' networks, a conventional operator lock needs to be adapted to accommodate not only the home operator's MCC-MNC combination, but also the roaming partner operators' MCC-MNC combinations.

Consequently, a loophole is created. Because the IMSI-based operator lock accommodates the roaming partner operator's MCC-MNC combination and is based on the active IMSI, the locked device will have full functionality when a roaming partner operator-issued UICC is installed in the locked device. This is inconsistent with the desired behavior of the operator lock, and may negatively affect the home operator's revenue if a significant number of mobile devices purchased from the home operator at subsidy prices are used not with home operator-issued UICCs, but with roaming partner operators-issued UICCs instead.

SUMMARY

One embodiment of the disclosure is directed to a method for determining whether mobile network functions of a locked device are to be permitted to operate, comprising: retrieving an IMS "IP Multimedia Subsystem" Private User Identity (IMPI) stored on a Universal Integrated Circuit Card (UICC) installed in the locked device; determining whether a configured condition relating to the IMPI stored on the UICC is met; and permitting the mobile network functions of the locked device to operate in response to determining that the configured condition is met.

DETAILED DESCRIPTION

Figure 1:
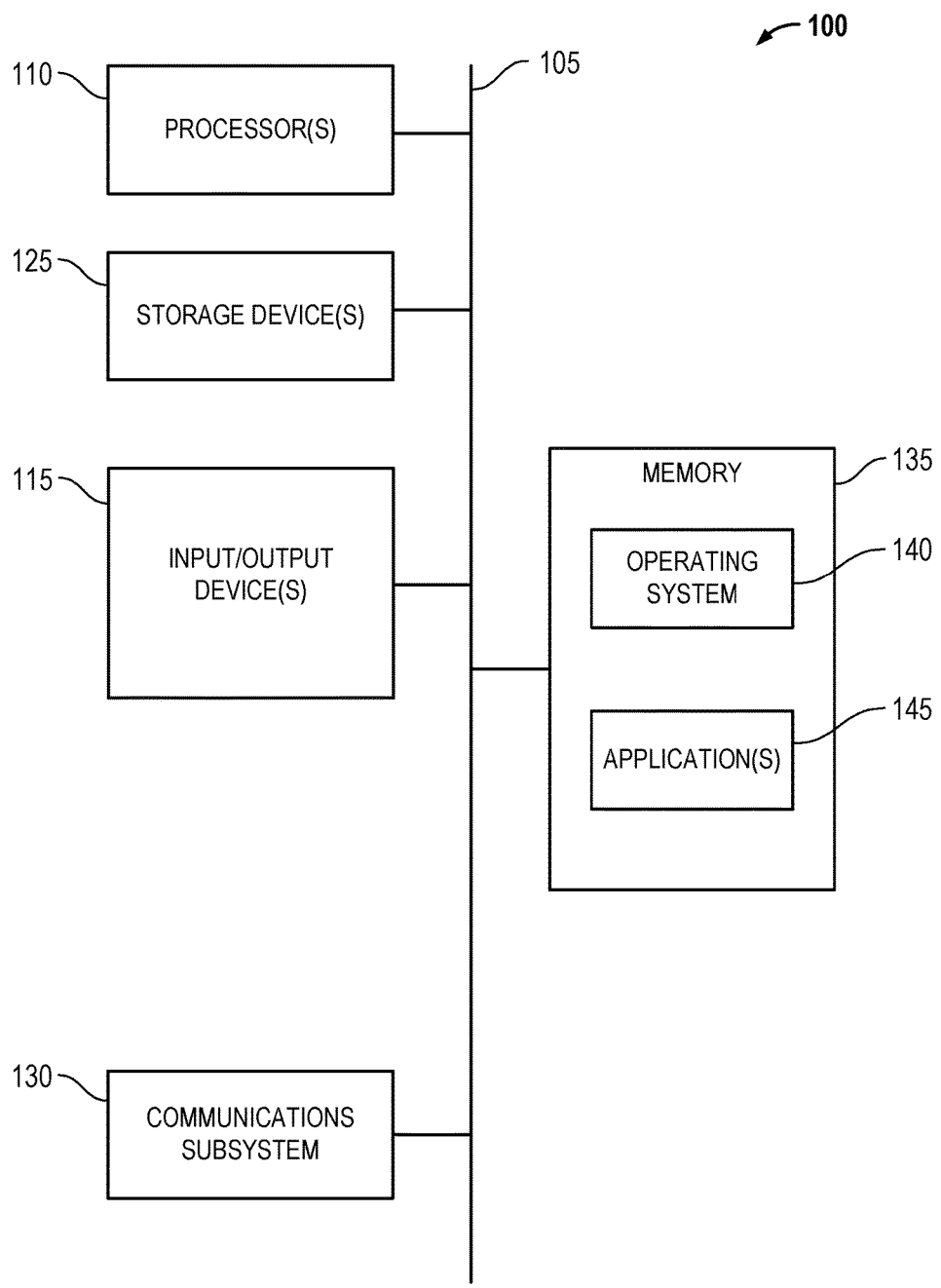
FIG. 1 is a block diagram illustrating an example device, according to one embodiment of the disclosure.

Referring to FIG. 1, a block diagram illustrating an example device 100 according to one embodiment of the disclosure, is shown. The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115 comprising a mouse, a keyboard, a display, a speaker, sensors, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 100 might also include a communication subsystem 130, which can include without limitation a modem, a network card (wireless or wired), an infrared communication device, a wireless communication device, chipset, and/or modem (such as a Bluetooth device, an 802.11 device, a Wi-Fi device, a WiMAX device, cellular communication modems/facilities, etc.), and/or the like. The communications subsystem 130 may permit data to be exchanged with a network, other computer systems/devices, and/or any other devices described herein. In many embodiments, the device 100 will further comprise a working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the device 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the device 100 and/or might take the form of source and/or installable code, which, upon compilation and/or installation on the device 100 (e.g., using any of a variety of generally available compilers, installation programs, compression/decompression utilities, etc.), then takes the form of executable code.

The device 100 may be a: mobile device, wireless device, cell phone, personal digital assistant, wearable device (for example, eyeglasses, watch, head wear, or similar bodily attached device), mobile computer, tablet, personal computer, laptop computer, data processing device/system, server, or any type of device that has processing and/or displaying capabilities.

Embodiments of the disclosure are related to an apparatus, method, and system for implementing an operator lock based on information contained in the IP "Internet Protocol" Multimedia Services Identity Module (ISIM) application that resides on the UICC. In particular, the operator lock may be based on the IMS "IP Multimedia Subsystem" Private User Identity (IMPI) information (also known as EF "Elementary File"_IMPI). Hereinafter the terms IMPI and EF_IMPI may be used interchangeably.

Figure 2:
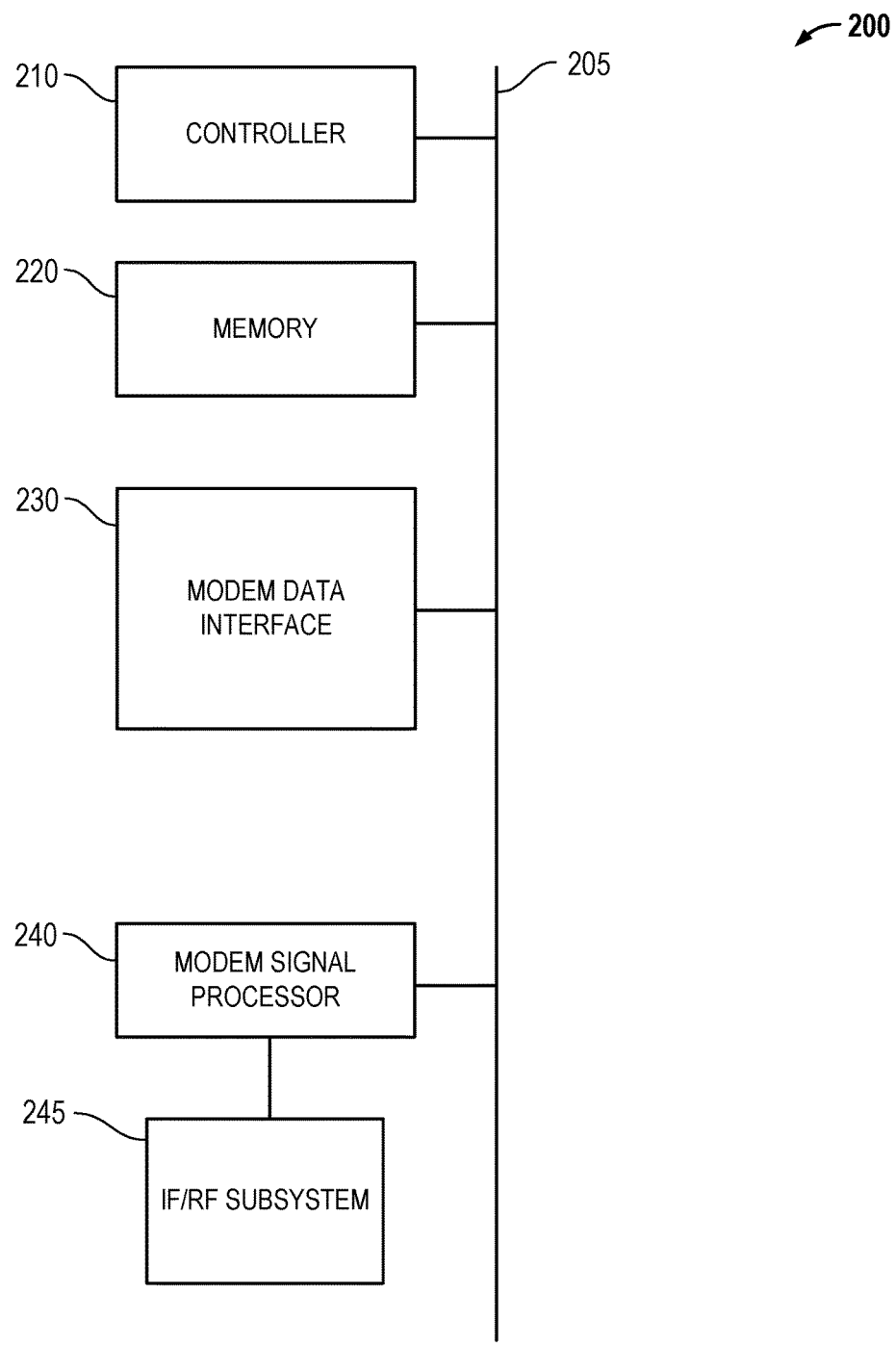
FIG. 2 is a block diagram illustrating an example modem, according to one embodiment of the disclosure.

Referring to FIG. 2, a block diagram illustrating an example modem 200 is shown. Modem 200 operates in accordance with one or more cellular mobile communication protocols. Modem 200 includes a data interface 230, a controller 210, a memory 220, a modem signal processor or module 240, such as one or more digital signal processors (DSP) or ASICs, an intermediate frequency "IF"/radio frequency "RF" subsystem 245, all coupled to one another over a data bus 205. The memory 220 may further comprise a secure file system that operates based on hardware-enforced data access limitations.

The IMS is an architectural framework for delivering IP multimedia services, especially over wireless interfaces. The ISIM is an application that resides on the UICC, and contains parameters for identifying and authenticating the user to the IMS. Among the data present on the ISIM are the IMPI, the home operator domain name, and one or more IP Multimedia Public Identities (IMPUs).

Because ideally the information contained in the ISIM is the same across the home and one or more roaming profiles, and does not change even if multi-IMSI roaming is utilized, the information contained in the ISIM can be used in place of the IMSI as a basis for a better operator lock to ensure that the mobile network functions of the locked device work with a home operator-issued UICC only.

In one embodiment, the IMPI is used as a basis for the operator lock. The IMPI has the form username@realm. An example IMPI may appear as follows: 1405874000215737@ims.mnc874.mcc405.3gppnetwork. org, where the string before the "@" character uniquely identifies the user subscription on the home operator's network, and the part of the IMPI after the "@" character identifies the home operator. In this example, the MNC (874) and the MCC (405) of the home operator can be identified from the IMPI.

The IMPI-based operator lock may comprise one or more (pre-) configured conditions relating to the IMPI stored on the installed UICC that should be met for the mobile network functions of the locked device to operate. The (pre-)configured conditions can vary, and do not limit the disclosure. In one embodiment, the IMPI stored on the installed UICC should indicate a particular MCC-MNC combination (e.g., the MCC-MNC combination associated with the home operator). In another embodiment, the realm field (i.e., the part after the "@" character) of the IMPI stored on the installed UICC should match a pre-configured domain name (e.g., a domain name associated with the home operator). In yet another embodiment, the IMPI stored on the installed UICC should be a full match for a pre-configured IMPI string (e.g., when the device is locked to a particular user subscription).

Figure 3:
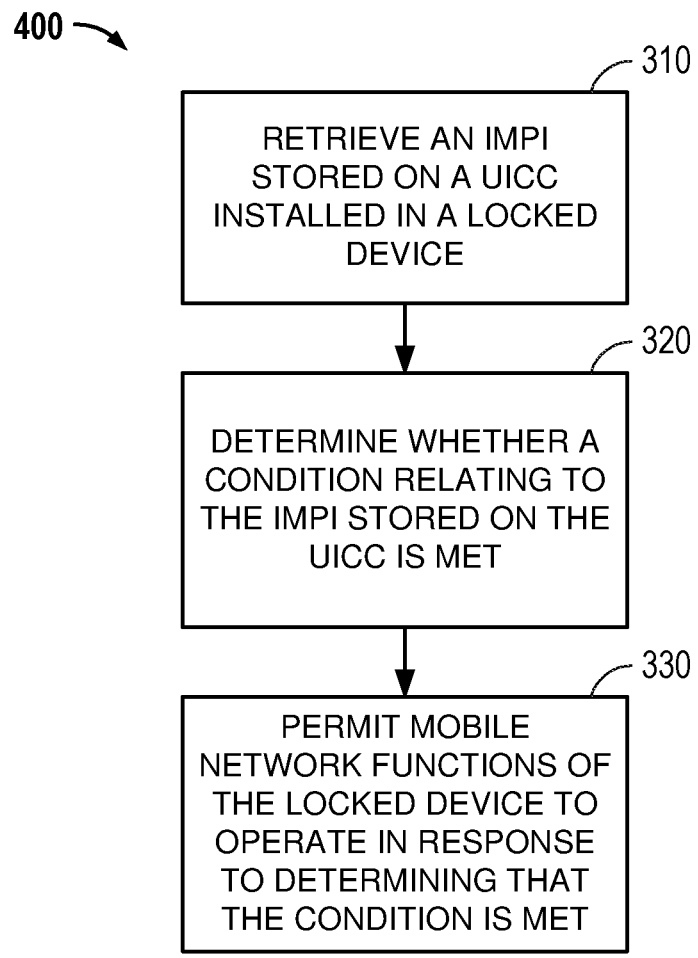
FIG. 3 is a flowchart illustrating an example method for determining whether mobile network functions of a locked device are to be permitted to operate.

Referring to FIG. 3, a flowchart illustrating an example method 300 for determining whether mobile network functions of a locked device should be permitted to operate is shown. At block 310, an IMPI stored on a UICC installed in the locked device is retrieved. At block 320, whether a (pre-)configured condition relating to the IMPI stored on the UICC is met may be determined. At block 330, the mobile network functions of the locked device may be permitted to operate in response to determining that the (pre-)configured condition is met. The mobile network functions of the locked device may not be permitted to operate in response to determining that the (pre-)configured condition is not met. Further, other functions of the locked device may also be blocked in response to determining that the (pre-)configured condition is not met.

Figure 4:
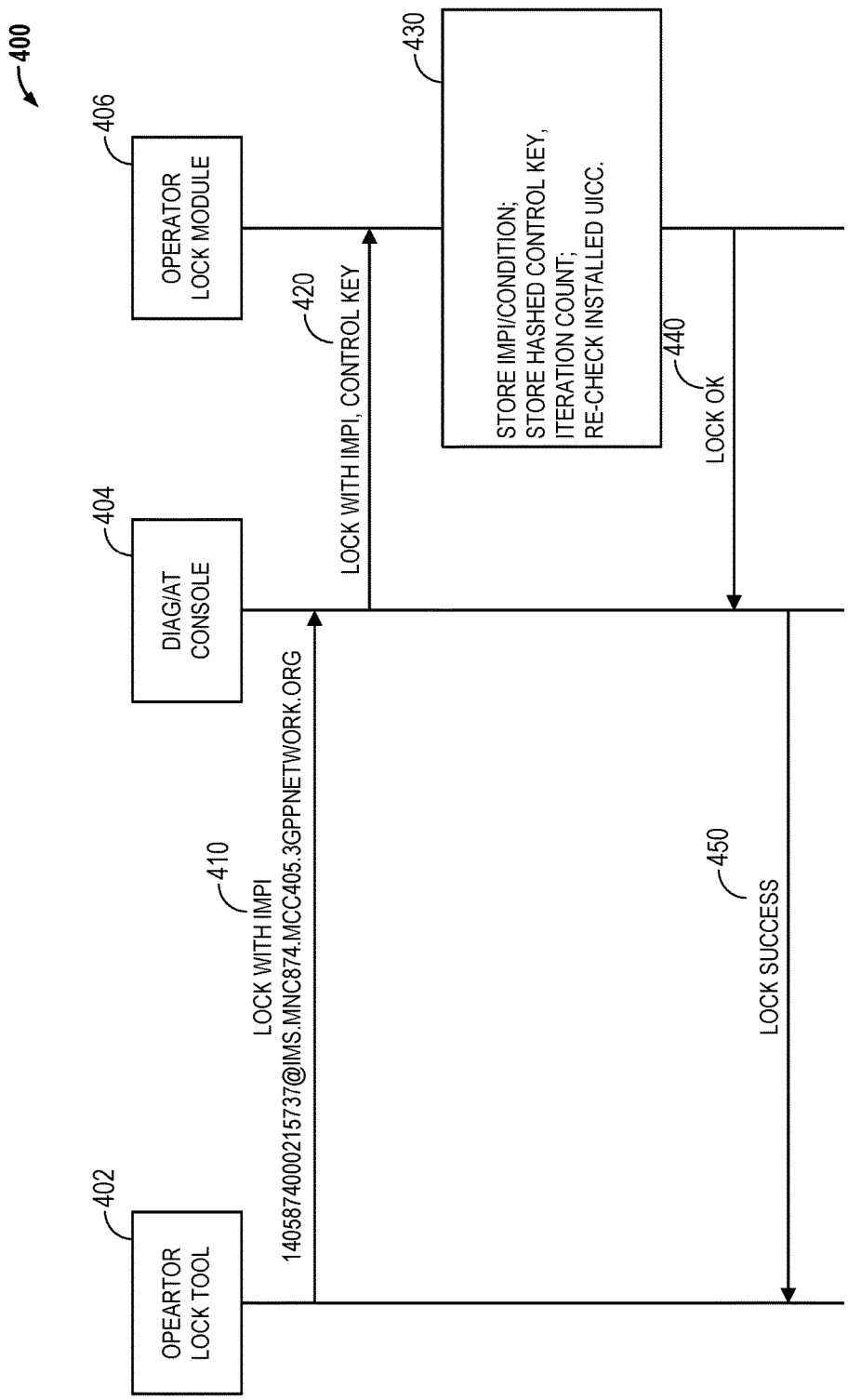
FIG. 4 is a diagram illustrating an example method for locking mobile network functions of a device.

Referring to FIG. 4, a diagram illustrating an example method 400 for locking mobile network functions of a device is shown. An operator lock tool module 402 (e.g., operated by a device manufacturer or an operator) may transmit a message 410 to a diagnostics/AT (Attention) console 404, the message 410 containing a request to place an IMPI-based operator lock on a device. In the illustrated example, the operator lock is associated with a (pre-) configured condition that the IMPI on the installed UICC should be a full match for the IMPI string "1405874000215737@ims.mnc874.mcc405.3gppnetwork. org". Next, the diagnostics/AT console 404 may transmit a lock command 420 to the operator lock module 406 of the modem of the device, commanding that the device be locked with the aforementioned IMPI-based operator lock. The lock command 420 may also be associated with a control key.

Upon receiving the lock command 420, the operator lock module 406 of the device modem may, at block 430, store the pre-configured IMPI string (and/or the (pre-)configured condition) in a storage of the device. The storage may be located inside the modem, or in any other suitable part of the device. In one embodiment, the storage may be a secure file system. The operator lock module 406 may also generate a hashed control key based on the received control key and an iteration count using a predetermined hash algorithm, and store the hashed control key and the iteration count in the modem storage. From this moment on and until the operator lock is removed, the mobile network functions of the device will work only if the IMPI on the installed UICC is a match for the pre-configured IMPI string.

The operator lock module 406 may then transmit a LOCK OK message 440 to the diagnostics/AT console 404. Upon receiving the LOCK OK message 440, the diagnostics/AT console 404 may transmit a LOCK SUCCESS message 450 to the operator lock tool module 402.

Figure 5:
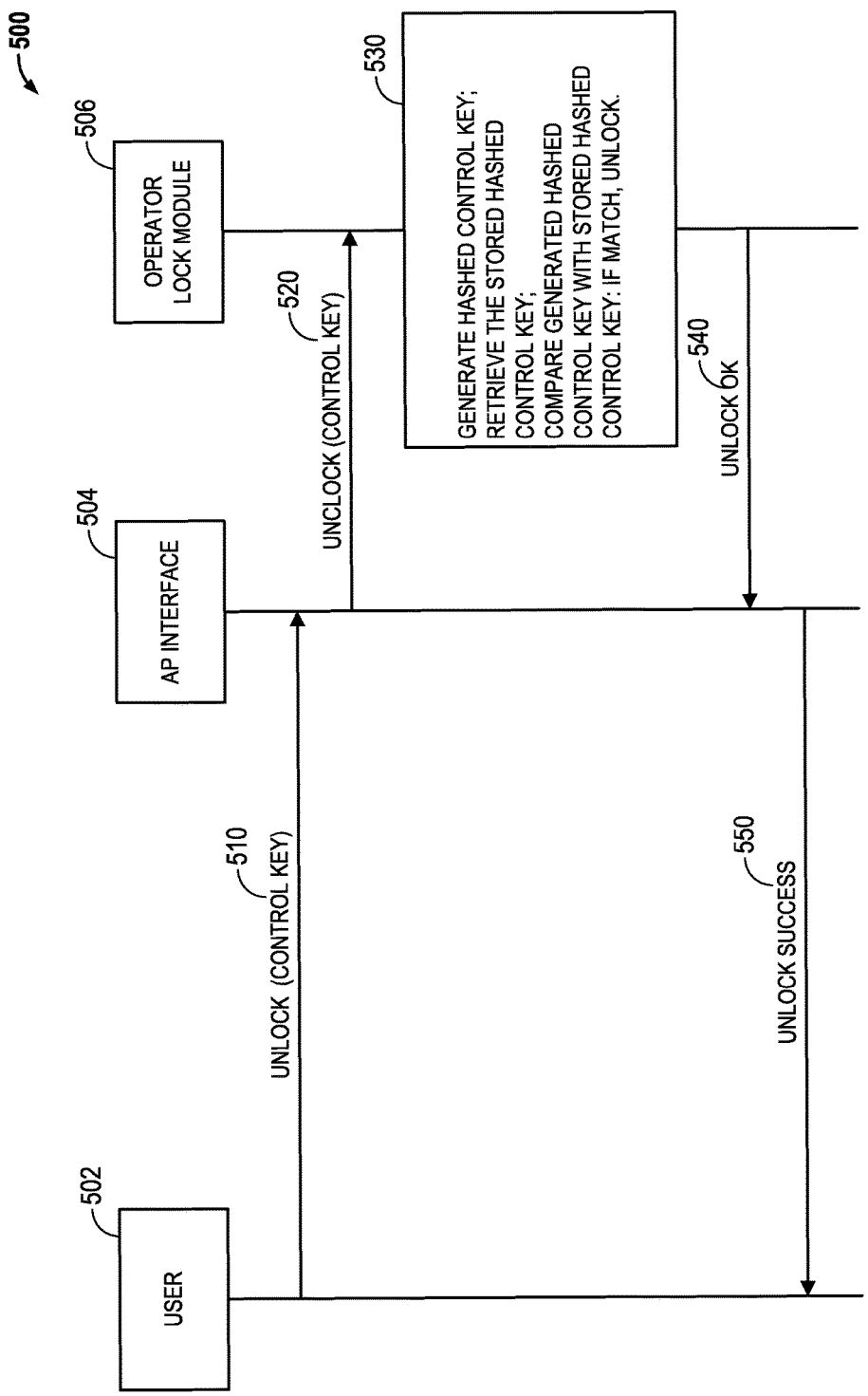
FIG. 5 is a diagram illustrating an example method for unlocking mobile network functions of a device.

Referring to FIG. 5, a diagram illustrating an example method 500 for unlocking mobile network functions of a device is shown. A user 502 may transmit a message 510 to an application processor (AP) interface 504, the message 510 containing a request to remove the IMPI-based operator lock. The message 510 may contain a control key (e.g., the user may have received the control key from the home operator upon completion of a subscription contract). Next, the AP interface 504 may transmit an unlock command 520 to the operator lock module 506 of the device modem, commanding that the IMPI-based operator lock be removed. The unlock command 520 may be associated with the control key received from the user 502.

Upon receiving the unlock command 520, the operator lock module 506 of the device modem may, at block 530, generate a hashed control key based on the control key received with the unlock command 520 and a stored iteration count using a predetermined hash algorithm, and compare the generated hashed control key with the stored hashed control key. If the two hashed control keys match, the operator lock module 506 may remove the IMPI-based operator lock. From this moment on, the mobile network functions of the device will work regardless of the installed UICC.

The operator lock module 506 may then transmit an UNLOCK OK message 540 to the AP interface 504. Upon receiving the UNLOCK OK message 540, the AP interface 504 may transmit an UNLOCK SUCCESS message 550 to the user 502.

One embodiment of the disclosure is directed to an apparatus comprising: a memory; and a processor coupled to the memory, the processor to: retrieve an IMPI stored on a UICC installed in the locked device; determine whether a (pre-)configured condition relating to the IMPI stored on the UICC is met; and permit the mobile network functions of the locked device to operate in response to determining that the (pre-)configured condition is met.

Various embodiments of an apparatus, method, and system for implementing an IMPI-based operator lock have been described. According to embodiments of the disclosure, information contained in the ISIM application on the UICC may be used as a basis for an operator lock to ensure that the mobile network functions of the locked device operate with home operator-issued UICCs only. In particular, the IMPI in the ISIM on the installed UICC may be used as a basis for an operator lock. The mobile network functions of the locked device may be permitted to operate only when the IMPI in the installed UICC meets a (pre-)configured condition. As the IMPI is expected to be the same across the home and roaming profiles on the UICC, even when multi-IMSI roaming is used, implementing an operator lock based on the IMPI can help ensure that the locked device is used only with a home operator-issued UICC without interfering with the ability of the device to roam onto a roaming partner operator's network with the roaming partner operator's IMSI. Therefore, the loophole associated with multi-IMSI roaming can be closed, and the home operator's ability to recoup the cost associated with subsidizing device purchases can be protected.

It should be appreciated that application or system that completes the relevant operations may be implemented as software, firmware, hardware, combinations thereof, etc. In one embodiment, the previous described functions may be implemented by one or more processors (e.g., processor 110, controller 210) of a device 100/modem 200 to achieve the previously desired functions (e.g., the method operations of FIGS. 3-5).

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for determining whether mobile network functions of a locked device are to be permitted to operate, comprising:
   retrieving an IMS "IP Multimedia Subsystem" Private User Identity (IMPI) stored on a Universal Integrated Circuit Card (UICC) installed in the locked device;
   determining whether a configured condition relating to the IMPI stored on the UICC is met; and
   permitting the mobile network functions of the locked device to operate in response to determining that the configured condition is met.

2. The method of claim 1, further comprising not permitting the mobile network functions of the locked device to operate in response to determining that the configured condition is not met.

3. The method of claim 1, wherein the configured condition specifies that the IMPI stored on the installed UICC indicates a particular Mobile Country Code (MCC)-Mobile Network Code (MNC) combination.

4. The method of claim 1, wherein the configured condition specifies that the IMPI stored on the installed UICC comprises a particular domain name.

5. The method of claim 1, wherein the configured condition specifies that the IMPI stored on the installed UICC fully matches a pre-configured IMPI string.

6. The method of claim 1, wherein the configured condition is stored in a secure file system in a modem of the locked device.

7. The method of claim 1, wherein the mobile network functions of the locked device are permitted to operate on a roaming partner operator's network with an International Mobile Subscriber Identity (IMSI) associated with the roaming partner operator.

8. The method of claim 7, wherein the mobile network functions of the locked device are not permitted to operate when a UICC issued by the roaming partner operator is installed in the locked device.

9. An apparatus, comprising:
a memory; and
a processor coupled to the memory, the processor to:
retrieve an IMS "IP Multimedia Subsystem" Private User Identity (IMPI) stored on a Universal Integrated Circuit Card (UICC) installed in a locked device;
determine whether a configured condition relating to the IMPI stored on the UICC is met; and
permit mobile network functions of the locked device to operate in response to determining that the configured condition is met.

10. The apparatus of claim 9, wherein the processor is further to not permit the mobile network functions of the locked device to operate in response to determining that the configured condition is not met.

11. The apparatus of claim 9, wherein the configured condition specifies that the IMPI stored on the installed UICC indicates a particular Mobile Country Code (MCC)-Mobile Network Code (MNC) combination.

12. The apparatus of claim 9, wherein the configured condition specifies that the IMPI stored on the installed UICC comprises a particular domain name.

13. The apparatus of claim 9, wherein the configured condition specifies that the IMPI stored on the installed UICC fully matches a pre-configured IMPI string.

14. The apparatus of claim 9, wherein the configured condition is stored in a secure file system in a modem of the locked device.

15. The apparatus of claim 9, wherein mobile network functions of the locked device are permitted to operate on a roaming partner operator's network with an International Mobile Subscriber Identity (IMSI) associated with the roaming partner operator.

16. The apparatus of claim 15, wherein mobile network functions of the locked device are not permitted to operate when a UICC issued by the roaming partner operator is installed in the locked device.

17. A mobile device comprising:
means for retrieving an IMS "IP Multimedia Subsystem" Private User Identity (IMPI) stored on a Universal Integrated Circuit Card (UICC) installed in the mobile device;
means for determining whether a configured condition relating to the IMPI stored on the UICC is met; and
means for permitting the mobile network functions of the mobile device to operate in response to determining that the configured condition is met.

18. The mobile device of claim 17, further comprising means for not permitting the mobile network functions of the mobile device to operate in response to determining that the configured condition is not met.

19. The mobile device of claim 17, wherein the configured condition specifies that the IMPI stored on the installed UICC indicates a particular Mobile Country Code (MCC)-Mobile Network Code (MNC) combination.

20. The mobile device of claim 17, wherein the configured condition specifies that the IMPI stored on the installed UICC comprises a particular domain name.

21. The mobile device of claim 17, wherein the configured condition specifies that the IMPI stored on the installed UICC fully matches a pre-configured IMPI string.

22. The mobile device of claim 17, wherein the configured condition is stored in a secure file system in a modem of the mobile device.

23. The mobile device of claim 17, wherein the mobile network functions of the mobile device are permitted to operate on a roaming partner operator's network with an International Mobile Subscriber Identity (IMSI) associated with the roaming partner operator.

24. The mobile device of claim 23, wherein the mobile network functions of the mobile device are not permitted to operate when a UICC issued by the roaming partner operator is installed in the mobile device.

25. A non-transitory computer-readable medium comprising code which, when executed by a processor, causes the processor to perform a method for determining whether mobile network functions of a locked device are to be permitted to operate, comprising:
retrieving an IMS "IP Multimedia Subsystem" Private User Identity (IMPI) stored on a Universal Integrated Circuit Card (UICC) installed in the locked device;
determining whether a configured condition relating to the IMPI stored on the UICC is met; and
permitting the mobile network functions of the locked device to operate in response to determining that the configured condition is met.

26. The non-transitory computer-readable medium of claim 25, further comprising code for not permitting the mobile network functions of the locked device to operate in response to determining that the configured condition is not met.

27. The non-transitory computer-readable medium of claim 25, wherein the configured condition specifies that the IMPI stored on the installed UICC indicates a particular Mobile Country Code (MCC)-Mobile Network Code (MNC) combination.

28. The non-transitory computer-readable medium of claim 25, wherein the configured condition specifies that the IMPI stored on the installed UICC comprises a particular domain name.

29. The non-transitory computer-readable medium of claim 25, wherein the configured condition specifies that the IMPI stored on the installed UICC fully matches a pre-configured IMPI string.

30. The non-transitory computer-readable medium of claim 25, wherein the configured condition is stored in a secure file system in a modem of the locked device.

* * * * *